(12) United States Patent
Tate et al.

(10) Patent No.: US 6,439,891 B1
(45) Date of Patent: Aug. 27, 2002

(54) SHOCK WAVE GENERATOR INCLUDING HIGH SPEED GAS VALVE

(75) Inventors: Stanley Eugene Tate, Kettering; John William Sellers, Jr., Spring Valley, both of OH (US)

(73) Assignee: Spectra Research, Inc., Dayton, OH (US)

( * ) Notice: Subject to any disclaimer, the term of this patent is extended or adjusted under 35 U.S.C. 154(b) by 0 days.

(21) Appl. No.: 09/444,821

(22) Filed: Nov. 22, 1999

Related U.S. Application Data
(60) Provisional application No. 60/109,643, filed on Nov. 24, 1998.

(51) Int. Cl.$^7$ .................................................. F41A 33/00
(52) U.S. Cl. ......................................................... 434/11
(58) Field of Search ........................... 434/11; 73/12.07, 73/147, 168; 251/129.01

(56) References Cited

U.S. PATENT DOCUMENTS

| 3,023,770 A | | 3/1962 | Godshalk |
| 3,119,405 A | | 1/1964 | Guy |
| 3,238,642 A | | 3/1966 | Ohlund |
| 3,415,269 A | | 12/1968 | Salerno |
| 3,711,061 A | * | 1/1973 | Moffatt ....................... 73/12.08 |
| 3,750,693 A | | 8/1973 | Hardison |
| 3,873,938 A | * | 3/1975 | Milling ........................ 434/11 |
| 4,346,736 A | | 8/1982 | Inada et al. |
| 4,437,645 A | | 3/1984 | Nomura et al. |
| 4,452,424 A | | 6/1984 | Kawata |
| 4,530,317 A | * | 7/1985 | Schutten ..................... 123/46 R |
| 4,878,488 A | * | 11/1989 | Naser ......................... 128/24 A |
| 4,917,150 A | | 4/1990 | Koch et al. |
| 4,925,155 A | | 5/1990 | Carman |
| 5,022,629 A | * | 6/1991 | Tibbals ...................... 251/129.02 |
| 5,115,665 A | * | 5/1992 | Lacey ........................... 73/12 |
| 5,161,776 A | * | 11/1992 | Nicholson ................... 251/30.05 |
| 5,419,369 A | | 5/1995 | House et al. |
| 5,505,081 A | * | 4/1996 | Lacey ........................... 73/147 |
| 5,511,978 A | * | 4/1996 | Sellers ......................... 434/11 |
| 5,606,110 A | * | 2/1997 | Lacey ......................... 73/12.08 |
| 5,884,591 A | * | 3/1999 | Giese ........................ 123/90.11 |

* cited by examiner

*Primary Examiner*—Derris H. Banks
*Assistant Examiner*—Kurt Fernstrom
(74) *Attorney, Agent, or Firm*—Killworth, Gottman, Hagan & Schaeff, L.L.P.

(57) ABSTRACT

A shock wave generator is provided incorporating a compressed gas reservoir, a high speed valve assembly, and a shock tube. The high speed valve assembly is arranged to open and close selectively a gas passage extending from the compressed gas reservoir to the shock tube. The high speed valve assembly comprises a valve sleeve, a valve seat, and a valve sleeve driving assembly. The valve sleeve is arranged to extend across the gas passage between a first side of the gas passage and a second side of the gas passage. The valve seat is arranged on the second side of the gas passage and is positioned to receive the valve sleeve upon extension of the valve sleeve across the gas passage. The valve sleeve driving assembly is arranged to cause extension and retraction of the valve sleeve across the gas passage. The valve sleeve defines a circular cross section and an epicentral valve sleeve axis and includes a valve sleeve flange arranged on a leading edge thereof. The valve seat is positioned to receive the valve sleeve flange such that pressurized gas from the compressed gas reservoir forcibly urges the valve sleeve flange against the valve seat.

19 Claims, 4 Drawing Sheets

SHOCK WAVE GENERATOR INCLUDING HIGH SPEED GAS VALVE

CROSS-REFERENCE TO RELATED APPLICATIONS

This application claims the benefit of U.S. Provisional Application Ser. No. 60/109,643, HIGH SPEED GAS VALVE, filed Nov. 24, 1998.

STATEMENT REGARDING FEDERALLY SPONSORED RESEARCH OR DEVELOPMENT

This invention was made with government support under Contract No. M67004-94C-0039 awarded by the U.S. Army. The Government has certain rights in this invention.

BACKGROUND OF THE INVENTION

The present invention relates to the creation of a shock wave and, more specifically, to a novel, reusable, and economical shock tube design.

Shock tubes are used to generate and study shock waves in applications such as supersonic aerodynamic research. For example, U.S. Pat. No. 5,511,978, the disclosure of which is incorporated herein by reference, teaches an explosion simulator device that utilizes a shock tube to produce a shock wave in the surrounding atmosphere. The shock tube illustrated therein consists of an open-mouthed tube connected to a compressed gas reservoir. The opening between the compressed gas reservoir and the shock tube is blocked by a frangible diaphragm. The frangible diaphragm may be broken by increasing the gas pressure to the bursting pressure of the diaphragm or by physically piercing the diaphragm by some external means. A shock wave is released from the shock tube when the diaphragm is burst. Unfortunately, once the diaphragm is burst and the shock wave released, the diaphragm must be replaced to reuse the device.

The above-described part replacement requirement represents a significant limitation on the utility of the explosion simulator taught in the '978 patent. Accordingly, there is a need for a shock wave simulator that is capable of producing repeated shock waves without the need for replacement parts.

BRIEF SUMMARY OF THE INVENTION

This need is met by the present invention wherein a shock wave generator having utility in a variety of applications is provided. The shock wave generator includes a high speed gas valve capable of repeatedly allowing pressurization of a compressed gas reservoir and permitting rapid release of the compressed gas into a shock tube.

In accordance with one embodiment of the present invention, a shock wave generator is provided comprising a compressed gas reservoir, a high speed valve assembly, and a shock tube. The high speed valve assembly is arranged to open and close selectively a gas passage extending from the compressed gas reservoir to the shock tube. The high speed valve assembly comprises a valve sleeve, a valve seat, and a valve sleeve driving assembly. The valve sleeve is arranged to extend across the gas passage between a first side of the gas passage and a second side of the gas passage. The valve seat is arranged on the second side of the gas passage and is positioned to receive the valve sleeve upon extension of the valve sleeve across the gas passage. The valve sleeve driving assembly is arranged to cause extension and retraction of the valve sleeve across the gas passage.

The valve sleeve preferably includes a valve sleeve flange arranged on a leading edge of the valve sleeve and the compressed gas reservoir is preferably arranged such that the compressed gas imparts uniform compressive loading upon the valve sleeve. More specifically, the valve sleeve may define a circular cross section and an epicentral valve sleeve axis and the gas passage may be arranged annularly about the circular valve sleeve. The valve sleeve flange and the valve seat are then preferably arranged such that pressurized gas from the compressed gas reservoir forcibly urges the sleeve flange against the valve seat.

The compressed gas reservoir, the gas passage, and the shock tube may be arranged to define a gas flow path that converges continuously from a first circular cross section to a smaller second circular cross section. The continuously converging gas flow path may converge while extending in a single direction or may define a reverse flow configuration.

The valve sleeve driving assembly may comprise a linear electric motor. The linear electric motor typically defines a motive axis that is parallel to the valve sleeve axis. Preferably, the linear electric motor comprises an armature and a field coil and the valve sleeve is physically coupled to the armature.

The valve sleeve driving assembly preferably includes a capacitive discharge power source arranged to enable rapid retraction of the valve sleeve across the gas passage. The valve sleeve driving assembly may further include an assist power source arranged to prevent recoil of the valve sleeve upon retraction of the valve sleeve and enable extension of the valve sleeve across the gas passage.

In accordance with another embodiment of the present invention, a shock wave generator is provided comprising a compressed gas reservoir, a high speed valve assembly, and a shock tube. The high speed valve assembly is arranged to selectively seal compressed gas within the compressed gas reservoir and selectively release compressed gas from the compressed gas reservoir into the shock tube. The high speed valve assembly comprises a valve sleeve, a valve seat, and a valve sleeve driving assembly. The valve sleeve defines a circular cross section and an epicentral valve sleeve axis and includes a valve sleeve flange arranged on a leading edge thereof. The valve seat is positioned to receive the valve sleeve flange such that pressurized gas from the compressed gas reservoir forcibly urges the valve sleeve flange against the valve seat. The valve sleeve driving assembly is arranged to impart movement to the valve sleeve along the valve sleeve axis. Preferably, the compressed gas reservoir is arranged such that the compressed gas imparts uniform compressive loading upon the valve sleeve.

Accordingly, it is an object of the present invention to provide a shock wave generator having utility in a variety of applications and having the capability of producing repeated shock waves without the need for replacement parts. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
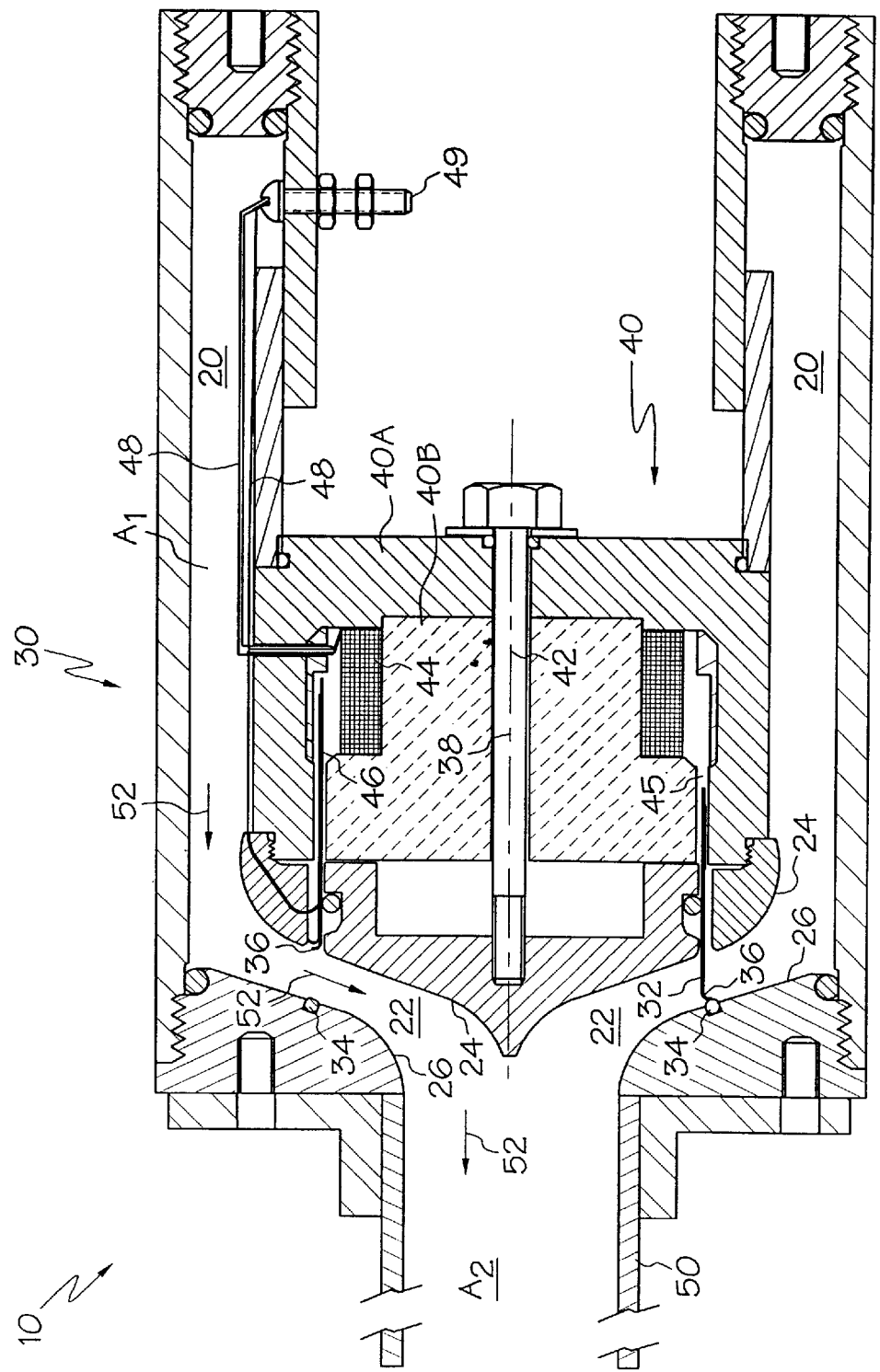
FIG. 1 is an illustration, in cross section, of a shock wave generator according to the present invention.

Referring initially to FIG. 1, a shock wave generator 10 according to the present invention comprises a compressed gas reservoir 20, a high speed valve assembly 30, and a shock tube 50. The shock tube 50 is open to the surrounding area. The high speed valve assembly 30 is arranged to open and close selectively a gas passage 22 extending from the compressed gas reservoir 20 to the shock tube 50. If the compressed gas reservoir 20 is sufficiently pressurized and the high speed valve assembly 30 is opened quickly enough, a shock wave is formed in the shock tube 50 and released to the surrounding area. As will be described in further detail below, the high speed valve assembly 30 enables repeatable compression of the compressed gas reservoir and repeatable production of the shock wave. A shock wave produced in this manner may be utilized as a repeatable explosion simulator, audible "bang" cue, diversion device, bird repellent, security alert device, gas expulsion device, projectile launcher, etc. The shock wave produced according to the present invention may also be utilized in a variety of additional applications, including those where the repeatable audible cue is accompanied by visual effects, such as a flash of light or a puff of smoke.

The high speed valve assembly 30 comprises a valve sleeve 32, a valve seat 34, and a valve sleeve driving assembly 40. The valve sleeve driving assembly 40 is arranged to cause extension and retraction of the valve sleeve 32 across the gas passage 22 between a first side 24 of the gas passage 22 and a second side 26 of the gas passage 22. A valve sleeve flange 36 is arranged on a leading edge of the valve sleeve 32. The valve seat 34 is arranged on the second side 26 of the gas passage 22 and is positioned to receive the valve sleeve flange 36 upon extension of the valve sleeve 32 across the gas passage 22. FIG. 1 is somewhat inaccurate in that it has been altered to illustrate both the extended and retracted state of the valve sleeve 32. In the illustrated embodiment, where the valve sleeve 32 comprises a single cylindrical sleeve, it would not be possible for one portion of the valve sleeve 32 to be in the extended state (see the lower portion of FIG. 1) and another portion of the valve sleeve to be in the retracted state (see the upper portion of FIG. 1).

As is clearly illustrated in FIG. 1, the valve sleeve 32 comprises a hollow cylinder. The valve sleeve 32 defines a circular cross section and an epicentral valve sleeve axis 38, i.e., the axis defined along the center of the valve sleeve cylinder. The gas passage 22 and the compressed gas reservoir 20 are arranged annularly about the circular valve sleeve 32. The valve sleeve flange 36 and the valve seat 34 are arranged such that pressurized gas from the compressed gas reservoir 20 imparts uniform compressive loading upon the valve sleeve 32 and forcibly urges the sleeve flange 36 against the valve seat 34.

As is clearly illustrated in FIG. 1, the compressed gas reservoir 20, the gas passage 22, and the shock tube 50 define a gas flow path 52 that converges continuously from a first circular cross section $A_1$ to a smaller second circular cross section $A_2$. In the FIG. 1 embodiment, the continuously converging gas flow path 52 converges while extending in a single direction. In contrast, according to the alternative embodiment illustrated in FIG. 2, where like elements are illustrated with like reference numerals, the compressed gas reservoir 20 is arranged such that the continuously converging gas flow path 52 defines a reverse flow configuration. For the purposes of describing and defining the present invention, a continuously converging path is one that experiences an overall reduction in cross section and does not include any portions where the cross-sectional dimension increases. A continuously converging path may include portions where the cross-sectional dimension of the path remain constant.

It is contemplated by the present invention that the compressed gas reservoir may also be arranged annularly about the gas passage 22 in the shape of a disk. It is further contemplated by the present invention that the length of the shock tube 50 may vary from a value significantly larger than that illustrated in FIGS. 1 and 2 to a minimal value that more closely resembles a mere gas passage aperture than an actual tube.

The valve sleeve driving assembly 40 comprises a linear electric motor that defines a motive axis 42 which is parallel to or, more preferably, is co-linear with the valve sleeve axis 38. The linear electric motor comprises an armature 46, a field coil 44, and a field magnet consisting of concentric outer pole piece 40a and inner pole piece 40b. Magnetic flux is excited in pole pieces 40a and 40b by the field coil 44. The magnetic pole pieces are preferably constructed of a material having high permeability and high saturation flux density, e.g., low carbon steel or pure iron.

Figure 2:
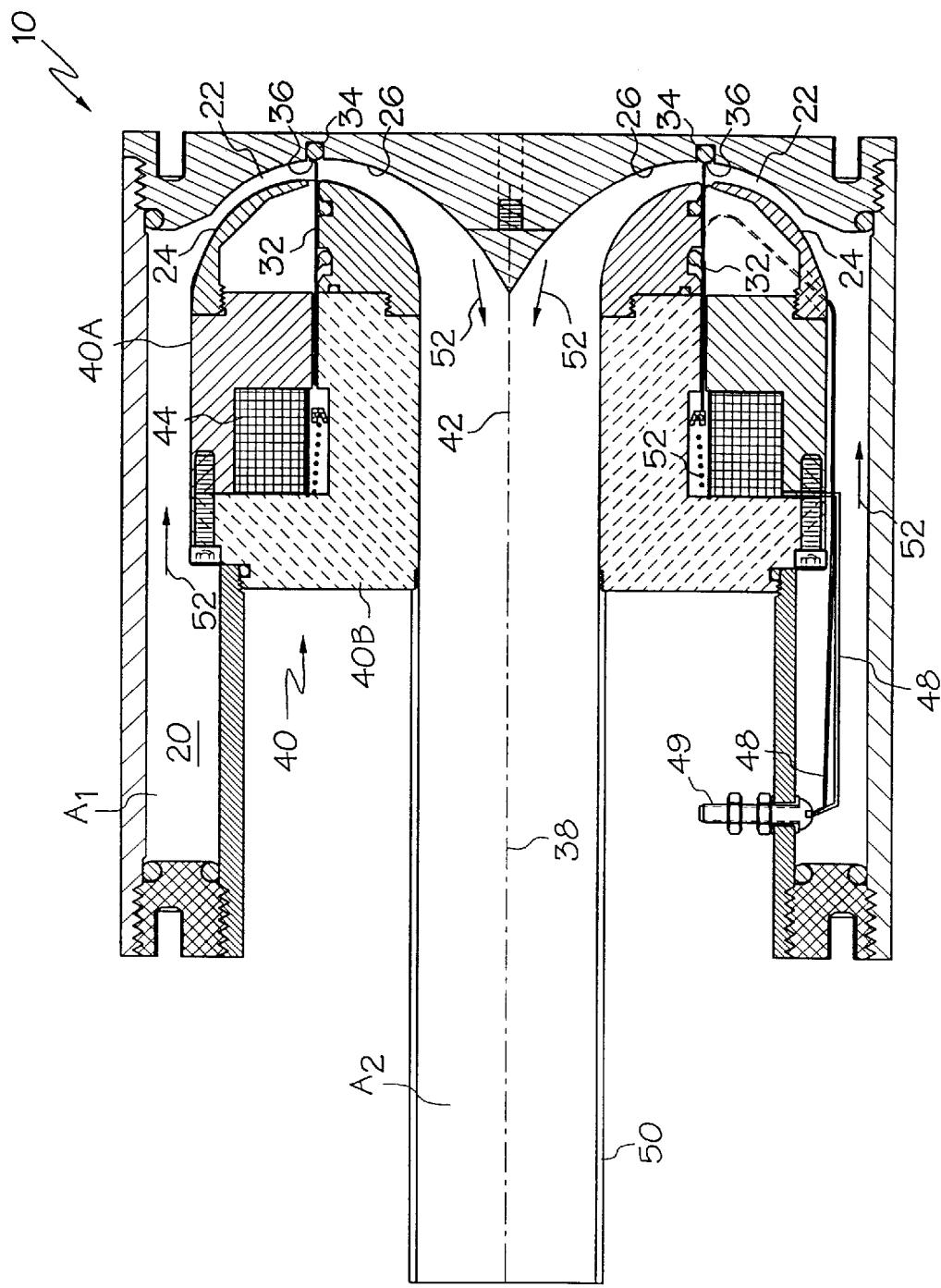
FIG. 2 is an illustration, in cross section, of an alternative shock wave generator according to the present invention.

The armature 46 includes an armature winding and is disposed in an annular gap 45 (see FIG. 1) to permit the armature 46 to move along the motive axis 42. The valve sleeve 32 is physically coupled to the armature 46 and is arranged to be movable along the motive axis 42 under the influence of the armature 46. Electrical connections 48 to the armature 46 and the field coil 44 may be provided through a pressure sealed terminal 49, as is illustrated in FIGS. 1 and 2. Respective springs 52 (see FIG. 2) may be provided to mechanically bias the armature 46 and valve sleeve 32 in the direction of the valve seat 34.

As will be described in detail herein with further reference to FIGS. 3 and 4, the valve sleeve driving assembly 40 includes a capacitive discharge power source 60 arranged to enable rapid retraction of the valve sleeve 32 across the gas passage 22. An additional current source 65 is arranged to extend the valve sleeve 32 across the gas passage 22 into engagement with the valve seat 34. The valve sleeve driving assembly 40 further includes an assist power source 70 (see FIG. 4) arranged to prevent recoil of the valve sleeve 32 upon retraction. The assist power source 70 also enables extension of the valve sleeve 32 across the gas passage.

Figure 3:
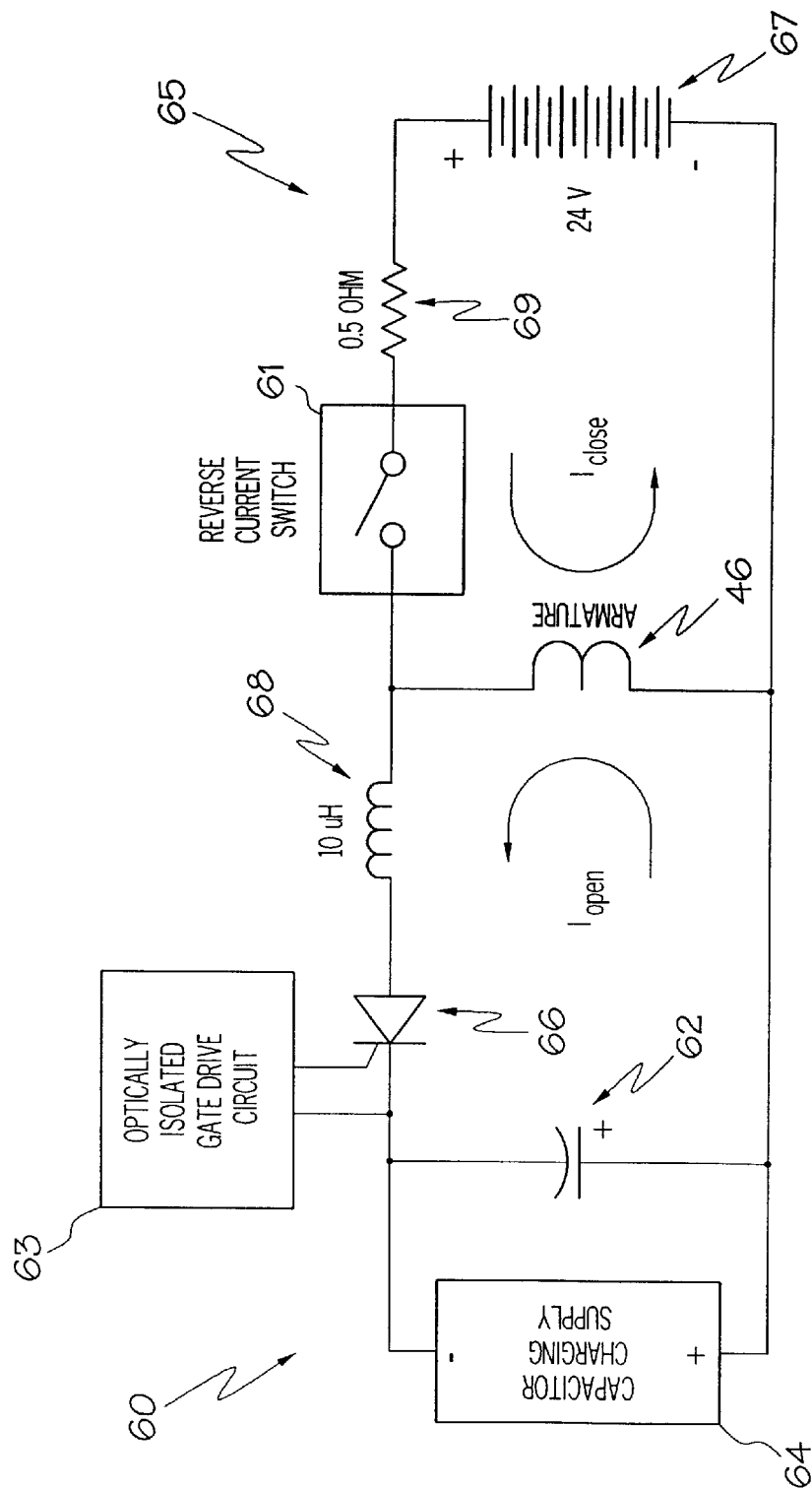
FIG. 3 is a schematic illustration of a power supply circuit for a shock wave generator according to the present invention.

A circuit incorporating a capacitive discharge power source 60 according to the present invention is illustrated in FIG. 3. In the FIG. 3 arrangement, the armature current $I_{open}$ necessary to retract the armature 46 and valve sleeve 32 is supplied by a capacitor 62 which is charged to a predetermined voltage by a DC power supply 64. The armature current $I_{open}$ is produced by discharging the capacitor 62 through the armature 46 by means of a high power silicon controlled rectifier (SCR) 66, also known as a thyristor. A 10 $\mu$H inductor 68 is connected in series with the SCR 66 to limit the rate of current rise to a value within the ratings of the SCR 66. Typical capacitor values are on the order of 10,000 microfarads at voltages of 200 to 400 Volts. An optically isolated gate drive circuit 63 is provided to supply a fast-rising drive current pulse to the gate terminal of SCR 66. Optical isolation is required because the gate drive pulse is referred to the potential at the cathode terminal of the SCR while the input signal to the gate drive circuit (not shown) is typically referred to circuit ground. The additional current source 65 is controlled by a reverse current switch 61 and comprises a 24 Volt DC power source 67 connected in series with a 0.5 Ωcurrent limiting resistor 69. This additional current source 65 provides the current $I_{close}$ necessary to extend the armature 46 and valve sleeve 32. Since the armature resistance, including the leads 48, is typically on the order of a few mΩ, the resulting current $I_{close}$ is approximately 48 Amps. The polarity of the closing current $I_{close}$ is opposite that of the opening current $I_{open}$.

Figure 4:
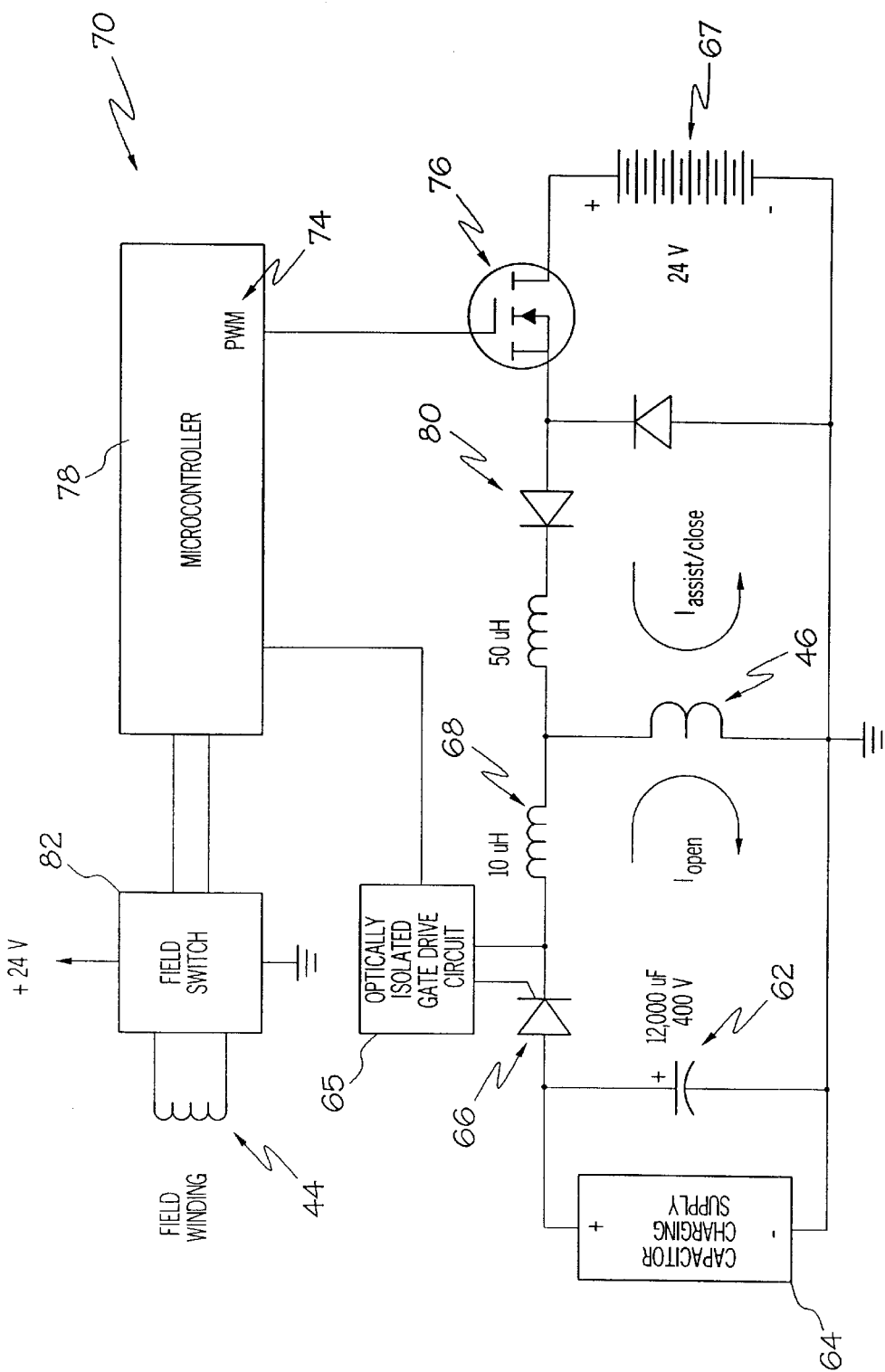
FIG. 4 is a schematic illustration of an alternative power supply circuit for a shock wave generator according to the present invention.

An alternative circuit configuration incorporating a capacitive discharge power source 60 is illustrated in FIG. 4. As is the case in the FIG. 3 arrangement, the armature current $I_{open}$ necessary to retract the armature 46 and valve sleeve 32 is supplied by a capacitor 62 which is charged to a predetermined voltage by a DC power supply 64. The armature current $I_{open}$ is produced by discharging the capacitor 62 through the armature 46 by means of a high power silicon controlled rectifier (SCR) 66. In experiments with the high speed valve assembly 30 of the present invention, it has been found advantageous to provide a sustained current $I_{assist}$ on the order of approximately 100 Amps, for a few milliseconds after the initial pulse of the armature current $I_{open}$. The circuitry for generating the sustained current assist is described in detail below. The sustained current $I_{assist}$ helps to prevent premature rejoinder of the valve sleeve flange 36 with the valve seat 34 by providing a resistance to any sleeve rebound resulting from rapid retraction of the sleeve 32. More specifically, the sleeve 32 may be prone to rebound or recoil after contact with a stop bumper or spring 52 provided in the path of the armature 46. By reversing the polarity of the current at the field coil 44 of the valve sleeve driving assembly 40, the circuitry associated with generation of the sustained current $I_{assist}$ is also utilized to provide the closing current $I_{close}$ necessary to extend the armature 46 and valve sleeve 32. A field current switch 82 is provided to switch the field current in the opening and closing direction as required.

In the circuit arrangement of FIG. 4, the sustained current $I_{assist}$ is provided by a pulse-width-modulation (PWM) circuit including a power field effect transistor (FET) 76 controlled by a microcontroller 78 that generates a pulse width modulation signal 74. A 50 μH inductor 80 is connected in series with the FET 76 to serve as the energy storage element of the PWM circuit 74. The microcontroller 78 also controls the field current switch 82, the SCR 66, and the optically isolated gate drive circuit 65 associated with the DC power supply 64.

Having described the invention in detail and by reference to preferred embodiments thereof, it will be apparent that modifications and variations are possible without departing from the scope of the invention defined in the appended claims.

What is claimed is:

1. A shock wave generator comprising a compressed gas reservoir, a high speed valve assembly, and a shock tube, wherein said high speed valve assembly is arranged to open and close selectively a gas passage extending from said compressed gas reservoir to said shock tube, and wherein said high speed valve assembly comprises:
   a valve sleeve arranged to extend across said gas passage between a first side of said gas passage and a second side of said gas passage; and
   a valve seat arranged on said second side of said gas passage and positioned to receive said valve sleeve upon extension of said valve sleeve across said gas passage;
   a valve sleeve driving assembly arranged to cause extension and retraction of said valve sleeve across said gas passage, wherein said valve sleeve driving assembly includes a capacitive discharge power source arranged to enable retraction of said valve sleeve across said gas passage.

2. A shock wave generator as claimed in claim 1 wherein said valve sleeve defines a circular cross section.

3. A shock wave generator as claimed in claim 1 wherein said gas passage is arranged annularly about said valve sleeve.

4. A shock wave generator as claimed in claim 1 wherein said compressed gas reservoir is arranged annularly about said valve sleeve.

5. A shock wave generator as claimed in claim 1 wherein said compressed gas reservoir is arranged such that said compressed gas imparts uniform compressive loading upon said valve sleeve.

6. A shock wave generator as claimed in claim 1 wherein said valve sleeve includes a valve sleeve flange arranged on a leading edge of said valve sleeve.

7. A shock wave generator as claimed in claim 6 wherein said valve sleeve flange and said valve seat are arranged such that pressurized gas from said compressed gas reservoir forcibly urges said sleeve flange against said valve seat.

8. A shock wave generator as claimed in claim 6 wherein said valve sleeve defines a circular cross section and an epicentral valve sleeve axis, said gas passage is arranged annularly about said circular valve sleeve, and said valve sleeve flange and said valve seat are arranged such that pressurized gas from said compressed gas reservoir forcibly urges said sleeve flange against said valve seat.

9. A shock wave generator as claimed in claim 1 wherein said compressed gas reservoir, said gas passage, and said shock tube are arranged to define a gas flow path that converges continuously from a first circular cross section to a smaller second circular cross section.

10. A shock wave generator as claimed in claim 9 wherein said continuously converging gas flow path converges while extending in a single direction.

11. A shock wave generator as claimed in claim 9 wherein said continuously converging gas flow path defines a reverse flow configuration.

12. A shock wave generator as claimed in claim 1 wherein said valve sleeve driving assembly comprises a linear electric motor.

13. A shock wave generator as claimed in claim 1 wherein said valve sleeve defines a circular cross section and an epicentral valve sleeve axis and wherein said linear electric motor defines a motive axis parallel to said valve sleeve axis.

14. A shock wave generator as claimed in claim 12 wherein said linear electric motor comprises and armature and a field coil.

15. A shock wave generator as claimed in claim 14 wherein said valve sleeve is physically coupled to said armature.

16. A shock wave generator as claimed in claim 1 wherein said valve sleeve driving assembly includes an additional power source arranged to enable extension of said valve sleeve across said gas passage.

17. A shock wave generator comprising a compressed gas reservoir, a high speed valve assembly, and shock tube, wherein said high speed valve assembly is arrange open and close selectively a gas passage extending from said compressed gas reservoir t shock tube, and wherein said high speed valve assembly comprises:

a valve sleeve arranged to extend across said gas passage between a first side of said gas passage and a second side of said gas passage;

a valve seat arranged on said second side of said gas passage and positioned to receive said valve sleeve upon extension of said valve sleeve across said gas passage; and a valve sleeve driving assembly arranged to cause extension and retraction of said valve sleeve across said gas passage, wherein said valve sleeve driving assembly includes a capacitive discharge power source arranged to enable retraction of said valve sleeve across said gas passage and further includes an assist power source arranged to prevent recoil of said valve sleeve upon retraction of said valve sleeve.

18. A shock wave generator as claimed in claim 17 wherein said assist power source is further arranged to enable extension of said valve sleeve across said gas passage.

19. A shock wave generator comprising a compressed gas reservoir, a high speed valve assembly, and a shock tube, wherein:

said high speed valve assembly is arranged to open and close selectively a gas passage extending from said compressed gas reservoir to said shock tube; and said high speed valve assembly includes a driving assembly and a capacitive discharge power source arranged to enable retraction of said high speed valve assembly.

* * * * *

UNITED STATES PATENT AND TRADEMARK OFFICE
CERTIFICATE OF CORRECTION

PATENT NO.    : 6,439,891 B1
DATED         : August 27, 2002
INVENTOR(S)   : Tate et al.

It is certified that error appears in the above-identified patent and that said Letters Patent is hereby corrected as shown below:

Column 6,
Line 67, patent reads "is arrange open and" should read -- is arranged to open and --

Column 7,
Line 2, patent reads "reservoir t shock tube" should read -- reservoir to said shock tube --

Signed and Sealed this

Eighteenth Day of February, 2003

JAMES E. ROGAN
*Director of the United States Patent and Trademark Office*